(12) United States Patent
Gotti et al.

(10) Patent No.: US 6,994,190 B1
(45) Date of Patent: Feb. 7, 2006

(54) BRAKE PAD FOR DISK BRAKE (75) Inventors: Giovanni Gotti, Alme' (IT); Luigi Cavestro, Valbrembo (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/257,244

(22) PCT Filed: Aug. 7, 2000

(86) PCT No.: PCT/IT00/00334

§ 371 (c)(1),
(2), (4) Date: Jan. 10, 2003

(87) PCT Pub. No.: WO02/12747

PCT Pub. Date: Feb. 14, 2002

(51) Int. Cl.
F16D 65/38 (2006.01)

(52) U.S. Cl. .................. 188/73.37; 188/73.36; 188/250 F; 188/250 G; 188/250 E (58) Field of Classification Search .......... 188/73.37, 188/73.36, 73.38, 73.35, 250 F, 250 G, 250 H, 188/250 D, 250 E
See application file for complete search history.

(56) References Cited

U.S. PATENT DOCUMENTS

| 4,473,140 A | * | 9/1984 | Komori | 188/250 G |
|---|---|---|---|---|
| 4,886,147 A | * | 12/1989 | Kroniger et al. | 188/73.37 |
| 5,538,104 A | * | 7/1996 | Katz et al. | 188/73.1 |
| 5,746,292 A | * | 5/1998 | Tanaka et al. | 188/73.37 |
| 5,842,546 A | * | 12/1998 | Biswas | 188/73.37 |
| 5,860,494 A | * | 1/1999 | Nishizawa et al. | 188/73.35 |
| 5,887,686 A | * | 3/1999 | Tanaka et al. | 188/250 E |
| 6,349,803 B2 | * | 2/2002 | Brosilow | 188/73.37 |
| 6,520,301 B2 | * | 2/2003 | Young | 188/250 G |
| 2001/0042661 A1 | * | 11/2001 | Treyde | 188/73.37 |
| 2004/0074712 A1 | * | 4/2004 | Quaglia et al. | 188/73.35 |

FOREIGN PATENT DOCUMENTS

| DE | 195 24 736 A1 | 1/1997 |
| DE | 199 20 079 A1 | 11/2000 |
| DE | 19920079 | * 11/2000 |
| EP | 0 737 823 A1 | 10/1996 |
| GB | 2291684 | * 1/1998 |
| JP | 55030554 | 3/1980 |
| JP | 60157526 | * 8/1985 |

* cited by examiner

Primary Examiner—Devon C. Kramer
(74) Attorney, Agent, or Firm—Dickstein Shapiro Morin & Oshinsky LLP (57) ABSTRACT

A pad for a disk brake comprising a plate for supporting a friction lining which can come into contact, at the braking stage, with a disk associated with the brake is characterized in that the pad comprises weights associated rigidly with the plate for varying the mass of at least one portion of the plate so as to achieve an inertia of the pad that substantially prevents vibrations of the pad which could cause noise of the disk brake during braking.

10 Claims, 7 Drawing Sheets

BRAKE PAD FOR DISK BRAKE

BACKGROUND OF THE INVENTION

The present invention relates to pads for disk brakes and to disk brakes using the pads.

In general, in a disk brake, the braking action is produced by means such as, for example, cylinder and piston units which act on opposite surfaces of a rotating disk by means of pads.

As is known, a noise is often generated during this braking action and takes the form of a particularly annoying whistle which reduces travelling comfort.

The generation of noise of this type is attributed to vibratory phenomena which involve various components of the brake, also including the pads.

Much research has been carried out with the purpose of suggesting techniques for reducing or eliminating braking noise.

One of these techniques proposes that a weight be connected, by means of a elastic body, to a component of the disk brake which might start to vibrate. According to this technique, any vibration of this component of the brake is transmitted to the weight which, for low frequencies, oscillates in phase with the component to which it is connected. As the vibration frequency increases, the oscillations of the weight and of the brake component become increasingly out of phase until a condition of phase opposite is reached, in which the vibration of the component is reduced or cancelled out. Moreover, according to this technique, the weight may be fitted alternatively on the piston, on the caliper body, or on the pad.

This technique requires the entire structure of the brake to be designed specifically.

This designing is necessary in order to produce an intermediate elastic element suitable to be placed between the brake component the oscillations of which are to be damped and a suitable weight, and also to provide a seat in which the weight can oscillate, deforming the elastic body.

The need to modify the structure of the brake so greatly in order to reduce the whistle phenomenon represents a considerable disadvantage. In fact, given the complexity of the phenomena which occur during a braking operation, and given their dependence on the particular application, that is to say on the type of vehicle in which the disk brakes are used, a particular solution which is optimal on the basis of theoretical simulations may not be satisfactory as a result of experimental tests or as a result of its use for applications other than those provided for.

Arrangements which do not have a great impact on the overall structure of the disk brake are therefore of particular interest.

SUMMARY OF THE INVENTION

The problem upon which the present invention is based is that of proposing a disk brake which has structural and functional characteristics such as to overcome the above-mentioned disadvantages mentioned with reference to the prior art.

This problem is solved by means of a pad for a disk brake comprising a plate for supporting a friction lining which can come into contact, at the braking stage, with a disk associated with the disk brake, characterized in that the pad comprises means associated rigidly with the plate for varying the mass of at least one portion of the plate so as to achieve an inertia of the pad that substantially prevents vibrations of the pad which could cause noise of the disk brake, during braking.

BRIEF DESCRIPTION OF THE SEVERAL VIEWS OF THE DRAWINGS

Further characteristics and the advantages of the invention will become clear from the following description of preferred embodiments thereof, provided by way of non-limiting example, with reference to the appended drawings, in which.

DETAILED DESCRIPTION OF THE PREFERRED EMBODIMENTS

Figure 1:
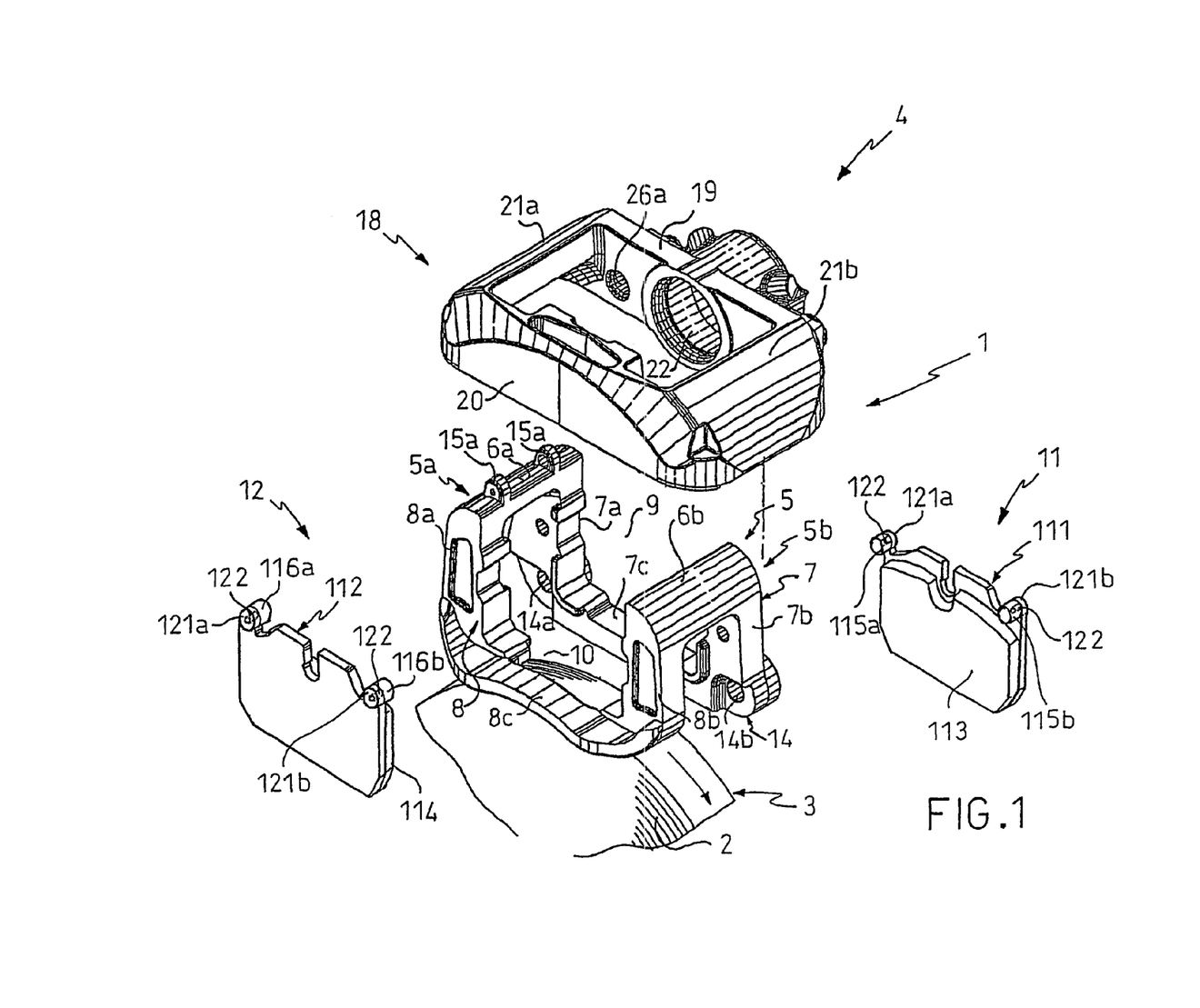
FIG. 1 is a perspective view of a braking unit comprising two pads, with parts separated, in accordance with a first embodiment of the invention.
Figure 2:
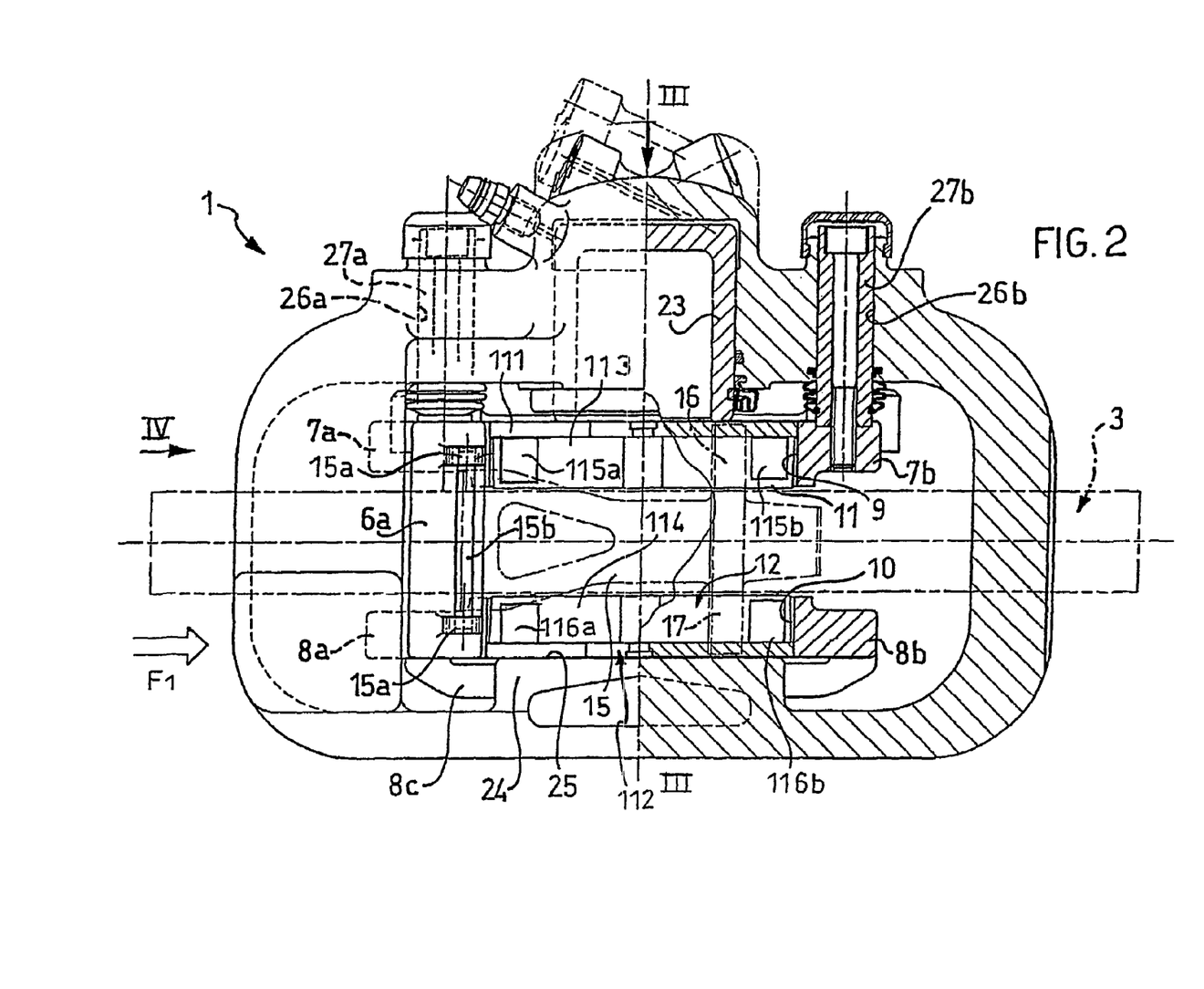
FIG. 2 is a plan view of the disk brake of FIG. 1, partially sectioned on the line II—II.
Figure 3:
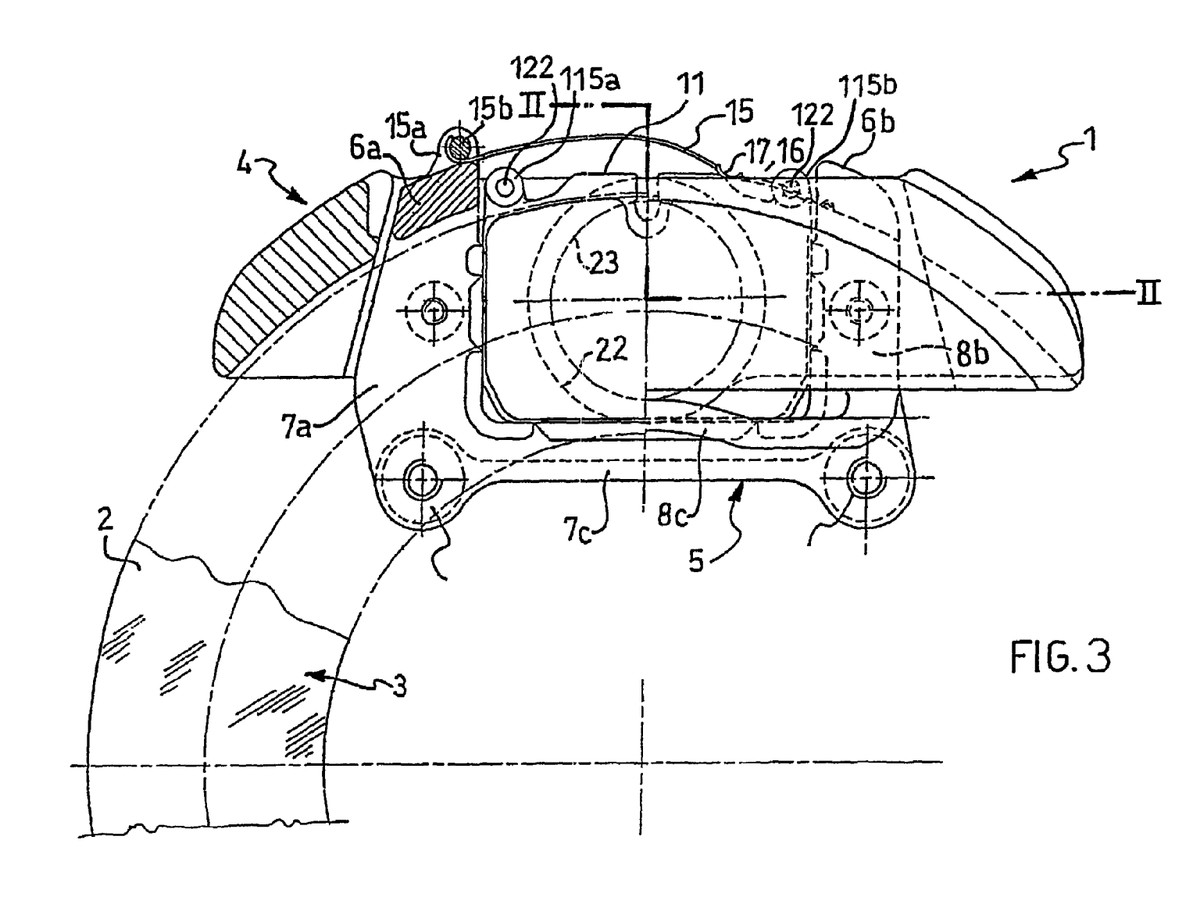
FIG. 3 is a partially-sectioned side view of the disk brake of FIG. 1.

With reference to FIGS. 1, 2 and 3, taken together, these show a disk brake 1 which can act on a braking band 2 of a disk 3 forming a braking unit 4, particularly for a motor vehicle, not shown.

In the particular embodiment shown in FIGS. 1, 2 and 3, the disk brake 1 is of the floating-caliper type, but the present invention may be applied to disk brakes of different types such as, for example, fixed-caliper disk brakes.

The disk brake 1 can be fixed to a stub axle of the motor-vehicle suspension and the disk 3 can be associated with a wheel of the motor vehicle. With reference to FIG. 2, for a rotation of the disk 3 in the direction indicated by the arrow F1, the portions of the disk which lie on the left-hand side and on the right-hand side of the line III—III are defined as the input region and the output region for the disk 3, respectively.

The disk brake 1 comprises a caliper-holder body 5 in turn comprising two bridge elements or yokes 5a and 5b both of which are U-shaped and which lie in mutually spaced-apart planes. Each yoke 5a (5b) has a substantially shaft-shaped end 6a (6b) and two sides 7a, 8a (7b, 8b). The two yokes 5a (5b) are connected to one another rigidly in the region of the ends of the sides 7a and 7b and of the sides 8a and 8b, respectively, by respective cross-members 7c and 8c.

Respective seats 9 and 10 are formed in the sides 7 and 8 for housing respective pads 11 and 12.

The caliper-holder body 5 has holes 14a and 14b disposed at the ends of the cross-member 7c for the fixing of the caliper-holder body 5 to the stub axle of the motor-vehicle suspension.

A spring 15 is provided for restraining the pads 11 and 12. The spring 15 extends between the pads 11 and 12 and the caliper-holder body 5. In particular, the spring 15 is shaped as a leaf-spring with one end supported, by means of a pin 15b, by lugs 15a projecting form the end 6a and with an opposite end fitted under the end 6b. In an intermediate region, the spring 15 comprises two arms 16 and 17 acting on the pads 11 and 12, respectively.

The disk brake 1 comprises a substantially rectangular, rigid frame 18 through which the caliper-holder body 5 extends in an assembled configuration of the disk brake. The rigid frame 18 can surround the caliper-holder body 5 in the manner of a frame.

In particular, the rigid frame 18 is formed by opposed long sides, indicated 19 and 20, and by opposed short sides, indicated 21a and 21b.

The long side 19 extends beside the side 7 at the level of the seat 9 and has a seat 22 for a hydraulic piston 23 acting on the pad 11.

The long side 20 extends beside the side 8 at the level of the seat 10 of the pad 12 and has a projection 24 having a flat surface 25 which faces the seat 10 and can act on the pad 12.

In the region of the long side 19, the frame 18 has two cylindrical seats 26a and 26b, which are arranged one on each side of the seat 22 of the piston 23, and which are in engagement for sliding in a guided manner with two cylindrical guides 27a and 27b fixed to the caliper-holder body 5 in the region of the sides 7a and 7b.

The pads 11 and 12 comprise respective plates 111 and 112 for supporting corresponding friction linings 113 and 114.

Means are associated with the end portions of each plate 111 (112) for varying the mass of these portions. In the specific example shown, these mass-varying means comprise two weights 115a, 115b fitted on the plate 111 and two weights 116a and 116b fitted on the plate 112.

The pad 11 and the plate 111 will be described in detail below but, as will be clear to an expert in the art, this description can easily be extended to the pad 12 and to the plate 112 which are just the same as the pad 11 and the plate 111.

The plate 111 advantageously has a portion 121a and a portion 121b each having a rounded shape. The two portions 121a and 121b are disposed at opposite ends of the plate so that they face the input and output regions of the disk 3, respectively, when the plate is mounted in the disk brake 1. These two portions 121a and 121b of the plate 111 have an initial mass mi.

According to the particular embodiment of the invention shown in FIGS. 1–3, the two portions 121a and 121b are appropriately provided with screws 122 for the fixing of the weights 115a and 115b which, in the embodiment shown, are cylindrical and have respective threaded holes suitable for housing screws 122. The weights 115a and 115b may be made of the same material of which the plate is made, or of a material having a different specific weight from that of the plate.

The weights 115a and 115b are arranged on the plate 11 in a suitable manner such that they are disposed beyond the outer edge of the disk when the plate is mounted in the disk brake 1. Contact between the weights 115a and 115b and the disk 3 is thus avoided, even after the friction lining 113 has worn.

In order to prevent the weights 115a and 115b coming into contact with respective symmetrical weights 116a and 116b of the plate 112, as a result of wear of the friction lining 113, the weights 115a, 115b, 116a, 116b preferably project inwardly relative to the disk brake 1 by a distance equal to less than half of the thickness of the disk 3.

It should also be noted that other means such as, for example, rivets, nails, calking, welding, glues and the like, may be used instead of the screws 122 for fixing the weights 115a and 115b to the plate 111.

The fixing means used for the pad 11 enable the weights 115a and 115b to be coupled structurally to the plate 111 substantially rigidly, that is, in a manner such that the plate ill, together with the weights, substantially forms a single rigid body.

It is pointed out that the portions 121a and 121b provided with the weights 115a and 115b have an overall mass mc which has changed and, in the specific case, has increased in comparison with the initial mass mi which they had without the fitting of the weights.

It is pointed out, in particular, that the overall inertia of the pad provided with the weights 115a and 115b is modified in comparison with the inertia of the pad alone.

The cylindrical weights 115a and 115b are a particular example of mass-varying means which can be fitted on suitable portions of the plate 111.

Further means for varying the mass of a portion of the plate 111 may also be formed "integrally" with the plate during its production. For example, if the plate 111 is produced by casting, portions of the plate having a greater material content and hence a greater mass are formed. Alternatively, these portions of greater mass may be produced, for example, by folding suitable edge portions of the plate onto themselves. In this latter case, the plate 111 is formed by blanking of sheet metal resulting from a pressing stage, in which the presence of the necessary additional material in the form of edge portions suitable for bending is provided for. This additional material can be bent by deformation so as to confer the desired shape on a portion of the plate.

Figure 6:
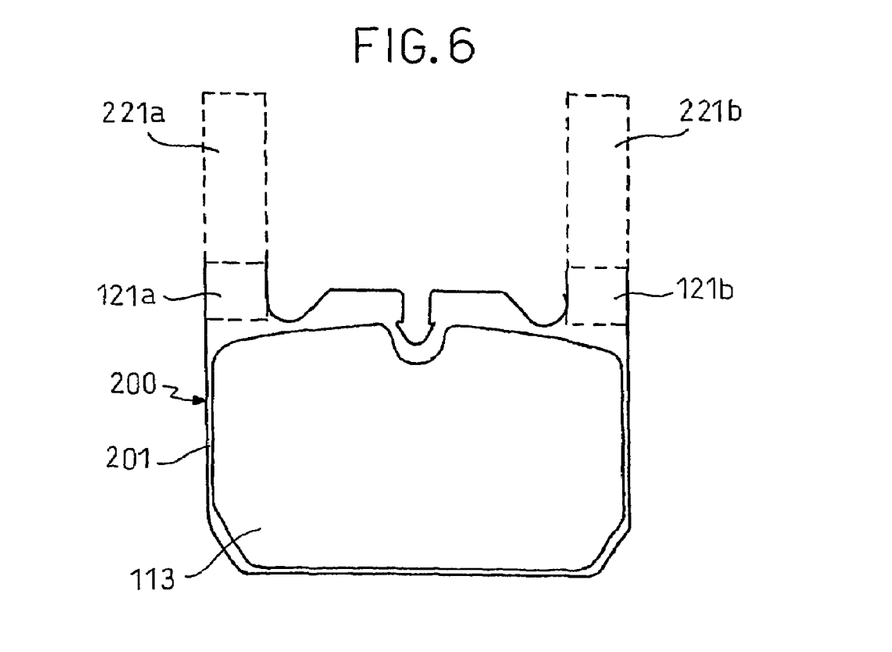
FIG. 6 is a schematic front view of a third embodiment of a pad according to the invention.

FIG. 6 shows a pad 200 of this type schematically and in a front view. The pad 200 comprises a plate 201 which supports the friction lining 113 and which, in the region of the portions 121a and 121b, has two edge portions 221a and 221b which can be bent onto themselves by deformation. In the embodiment shown in FIG. 6, the edge portions 221a and 221b, shown in broken outline, are in the form of strips.

Figure 7:
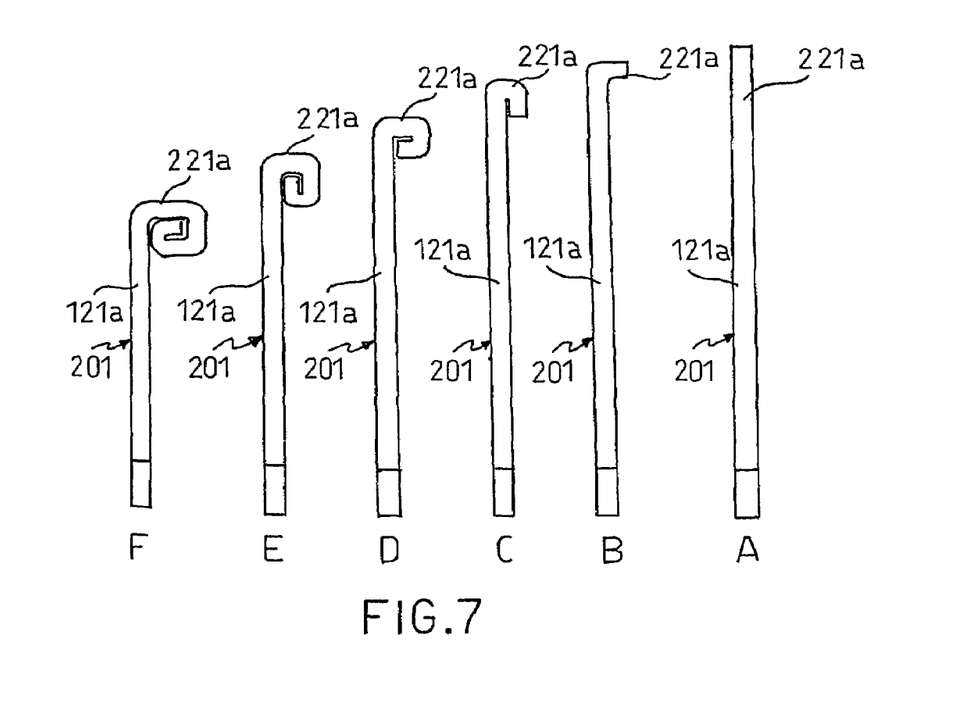
FIG. 7 shows successive steps A–F for the production of the plate of the pad of FIG. 6.

FIG. 7 shows six side views A–F of the plate 201, corresponding to six successive stages of the bending of the portions 221a and 221b. In stage A, the portions 221a and 221b of the plate 201 are in the non-bent state, as they are produced by the blanking, and in the subsequent stages, the portions are bent onto themselves until they adopt the final configuration F.

The weights 115a and 115b may also be produced with the use of the same material of which the friction lining 113 is made. In this connection, it should be noted that, in accordance with conventional techniques, the friction lining is fixed to the plate by causing the material which constitutes the friction lining to adhere to a surface of the plate by means of a suitable semi-open mould which confers the desired shape. The adhesion of the lining to the plate is achieved, in addition to possible gluing, by pressing the mould and hence the material held therein against the plate at suitable temperatures.

In order to produce weights 115a and 115b made of the same material as the lining, the above-described method used for fixing the lining itself may be used, with the mould modified so as to provide suitable cavities in which to place the additional material corresponding to the weights.

The physical and geometrical characteristics and the arrangement on the plate 111 of the means for varying the mass of one or more portions of the plate are such as to achieve an inertia of the pad 11 that substantially prevents vibrations of the pad which arise during braking and which may cause noise of the disk brake.

In particular, the mass-varying means are such that the pad 11 adopts natural vibration frequencies which cannot substantially be excited during the operation of the disk brake 1.

To complete the description, the operation of the disk brake 1 will be described below.

Upon braking, as a result of the thrust of the piston 23 against the pad 11, the frame 18 moves or floats along the guides until both the pad 11 on which the piston 23 acts and the opposed pad 12 on which the flat surface 25 acts are pressed into contact with the braking band 2 and act thereon with equal and opposite forces.

The advantages with regard to the noise of the disk brake according to the invention will become clearer from the following description of experimental analyses carried out on a conventional disc brake.

Figure 4:
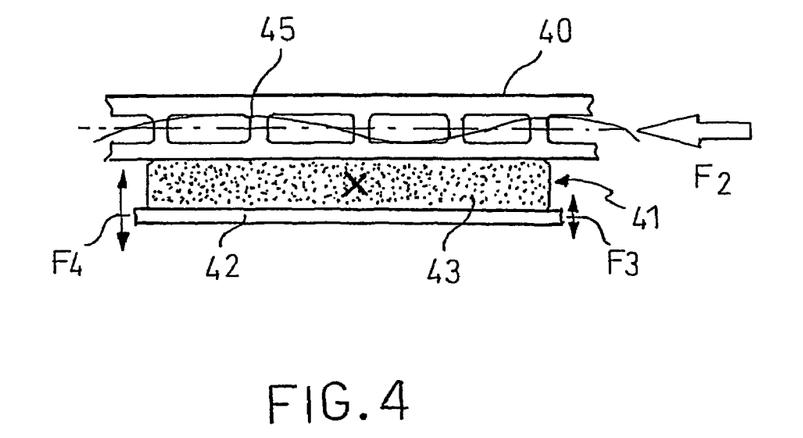
FIG. 4 is a schematic plan view of a disk and of a pad according to the prior art.

FIG. 4 shows in plan a disk 40 rotating in the direction indicated by the arrow F2. The disk 40 is in contact with a lining 43 of a pad 41 comprising a plate 42 for supporting the friction lining 43.

As a result of the test, and as shown schematically in FIG. 4, it was found that, during braking, the braking band of the disk 40 vibrates, adopting a substantially sinusoidal wave form represented by a curved line 45.

The vibration of the braking band of the disk 40 excites the pad 41 causing it to vibrate in turn. It was found that the pad 41 vibrates with a pivoting movement about an axis indicated by a cross in FIG. 4, substantially transverse the pad and parallel to a radial axis of the disk 40. This vibratory movement was observed as a result of measurements made by means of accelerometers which were placed on the pads 41 and which also detected different acceleration values in the regions of the pad facing the input and output regions of the disk 40.

In FIG. 4, the difference between the accelerations measured is indicated by arrows F3 and F4 of different sizes. It is pointed out that, a greater acceleration was measured in the output region of the disks 40 than in the input region. Moreover, it should be noted that, when the whistling phenomenon arises, not only do vibrations of the braking band and of the pad occur, but the various components of the brake vibrate in resonance, influencing one another. In other words, a chain of vibrating elements is established, starting from the disk and passing through the pads and the caliper body until it also involves the suspension of the vehicle and the vehicle body itself. Every element making up the disk brake vibrates at its own natural frequency.

In the disk brake 1 according to the invention, the means for varying the mass of one or more portions of the pad 11 enable the moment of inertia of the pad 11, evaluated with respect to the axis about which the pad vibrates during braking, to be modified.

As is known, the natural vibration frequency of any body, at which the body goes into resonance, is inversely proportional to the moment of inertia of the body.

The modification of the moment of inertia of the pad achieved by the above-mentioned mass-varying means causes the natural frequency of the pad to adopt a value which cannot substantially be excited by the other elements of the disk brake or by the disk itself during braking. In other words, in the disk brake formed in accordance with the invention, the chain of vibrating elements which is established during whistling is broken. Since the pad according to the invention is able neither to be excited nor to transmit the vibration, it represents a vibration-damping element.

Tests carried out on a disk brake similar to the disk brake 1 and formed in accordance with the invention have shown a reduction in whistling during braking.

In particular, the pad 11 formed in accordance with the invention is such as to have natural vibration frequencies which are not excited by the braking action or which fall outside the range of frequencies to which whistling phenomena normally correspond.

The characteristics of the mass-varying means associated with the plate can be determined experimentally in relation to a specific application, that is, for a specific disk brake and for a particular vehicle.

The following is an example of a method for determining the characteristics.

A conventional disk brake suitable for fitting in a specific vehicle and comprising two pads having an initial structure determined in accordance with a conventional design method is considered. For example, a disk brake of the type shown in FIGS. 1–3, in which the plates 111 and 112 have no weights 115a, 115b or 116a, 116b, is referred to. In this case, the plates 111 and 112 are substantially plate-shaped.

In a first step, the behaviour of the disk brake in operation is analyzed, for example, by fitting it on the vehicle for which it has been designed and evaluating its performance during braking.

Its performance can be evaluated with conventional instrumentation by determining the noise spectrum which is manifested by a whistle produced during braking, or by listening to the noise directly. The performance of the brake may also be evaluated by measuring the magnitude of the vibrations of the pad, preferably in those portions of the plate which face the input and output regions of the disc, with accelerometers known to experts in the art.

An expert in the art can easily establish a reference noise level corresponding to satisfactory performance for a given range of frequencies.

If performance is not satisfactory, that is, if there is a noise level greater than the reference level, a subsequent step comprising variation of the mass of one or more portions of the plates is performed.

As stated above, this variation of the mass is achieved, for example, by fitting weights rigidly to each plate.

Each plate advantageously comprises one or more fixing means similar to those defined above, which enable the weights to be fitted.

Figure 5:
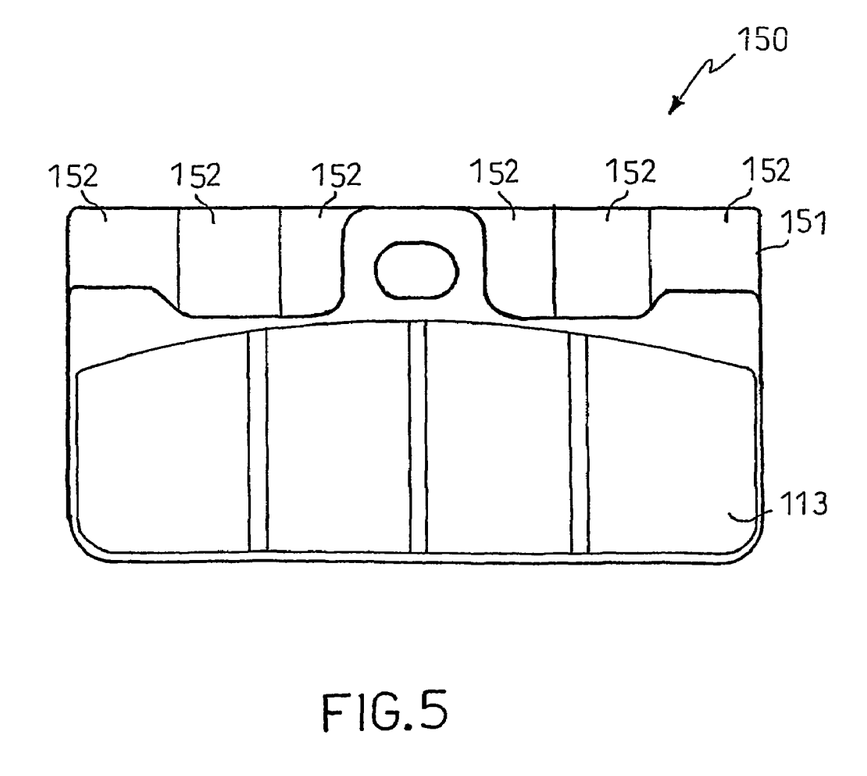
FIG. 5 is a schematic front view of a second embodiment of a pad according to the invention.

Alternatively, the pads according to the method described may be of the type shown schematically in FIG. 5. In FIG. 5 and in subsequent figures, the same reference numerals have been used as in the previous drawings to indicate similar or identical elements.

The pad 150 of FIG. 5 comprises a plate 151 having portions 152 which are removable from the plate. Each portion 152 can be removed in order to be replaced by a portion having a different mass, for example, having the same volume but a different specific weight, or may be removed without being replaced.

The removal of one or more portions 152 of the plate 151 leads to a reduction in the moment of inertia of the pad 150. The reduction in the moment of inertia may shift the natural vibration frequencies of the pad 150 towards higher values but in any case outside the range of frequencies which are excited particularly during braking. Portions of the material of the plate may also be removed by perforation of portions of the plate, insofar as the structural functions of these portions allow.

The weights fitted on the plates 111 and 112, as well as the other means which can be used to vary the mass, are advantageously positioned in a manner such that they do not come into contact with the friction lining.

These weights are preferably positioned in regions which are disposed at opposite ends of the plate and which face the input and output regions of the disk 3. The increase in the moment of inertia of the plate and of the pad as a whole in order to reduce its natural vibration frequency is thus maximized.

The weights will advantageously have a mass proportional to the acceleration of the region of the plate to which they are fitted.

On the basis of the test measurements, the mass of the weight 115b fitted to the region of the plate corresponding to the output region of the disk 3 is typically greater than the mass of the weight 115a fitted to the region of the plate corresponding to the input region of the disk 3.

The behaviour of the disk brake thus modified is analyzed again to asses whether the noise level is lower or higher than the reference level.

The modification of the mass is repeated until the disk brake has the desired performance with regard to noise, that is, until a value of the noise level approximately equal to preferably below the reference level is obtained.

The further modification may take place by replacing the weights previously fitted with other weights having lower or higher masses, or by adding other weights and/or by varying their positions. The fixing means applied to the plate, such as the screws 122, are advantageously such as to permit the subsequent removal of a weight previously fixed. Moreover, the other mass-modifying means described above or any other means suitable for the purpose are also applicable to this method.

When the disk brake analyzed achieves a satisfactory performance, the corresponding plates have adopted an optimal final structure as a result of the modifications applied.

Figure 8:
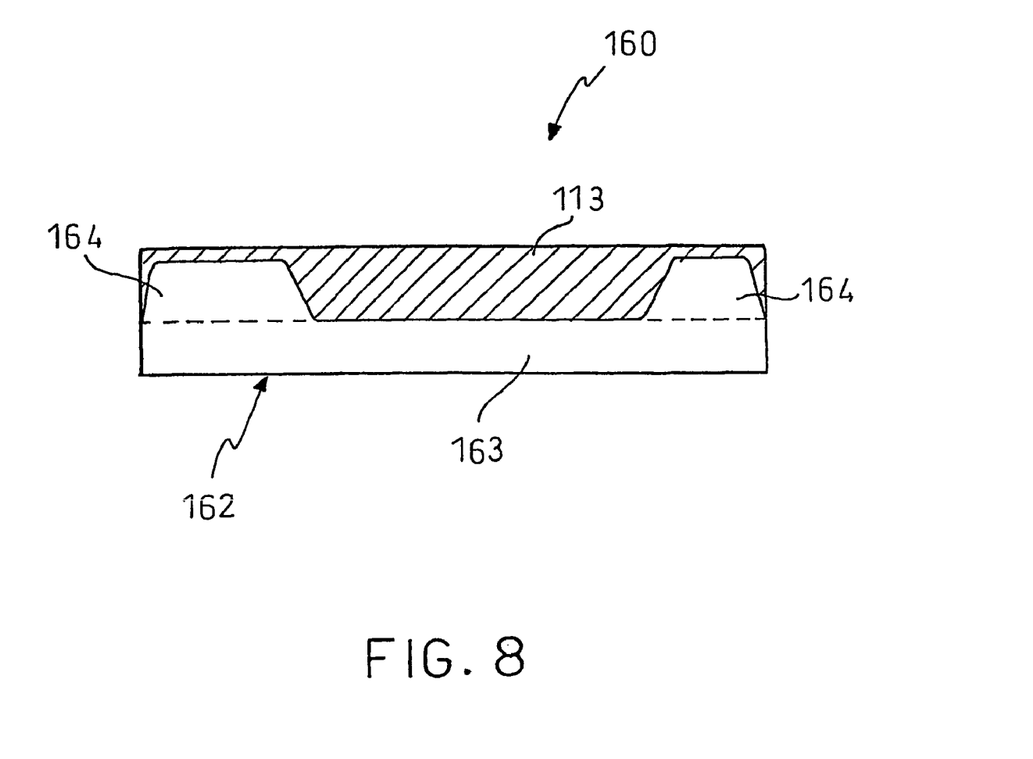
FIG. 8 is a plan view of a fourth embodiment of a pad according to the invention.

These plates may themselves represent the plates which are suitable for that specific disk brake or may be considered as prototypes for the design of definitive plates. For example, the definitive plates may make use of mass-varying means produced integrally at the production stage, as described above, but nevertheless having characteristics similar to those resulting from the tests performed. In this connection, FIG. 8 shows a side view of a pad 160 comprising a plate 162.

The plate 162 comprises a substantially plate-shaped main body 163 and, at its ends, two portions 164 fixed to the main body 163, produced by casting, and having a function similar to that of the weights used in the above-described method according to the invention. As can be seen from FIG. 8, the two portions 164 appear as projections which extend from the main body 163 towards the lining 113, giving the plate 162 a generally non-plate-like shape. In the embodiment of FIG. 8, the masses of two portions 164 are different and depend on the positions which the two portions 164 adopt within the disk brake, relative to the input and output regions of the disk.

The above-described method according to the invention is particularly advantageous since the modifications to be performed on the structure of the plate in order to determine an optimal structure do not involve substantial modification of the other components of the disk brake (for example the caliper body or the piston). This means that the pad produced by the method according to the invention can also be used to replace conventional pads present in already-existing disk brakes of the same type.

Figure 9:
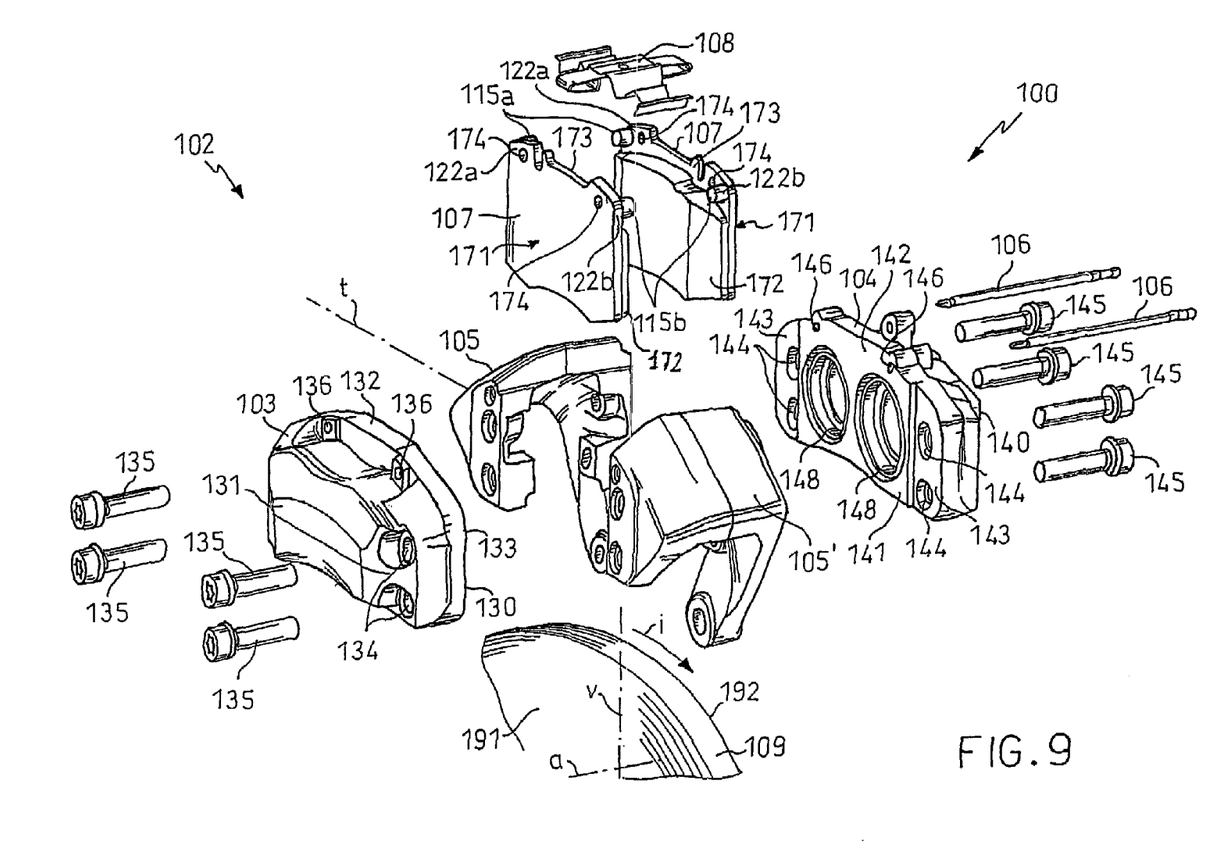
FIG. 9 is a perspective view of a fixed-caliper disk brake, according to the invention.

FIG. 9 shows a fixed-caliper disk brake 100.

This unit comprises a caliper, generally indicated 102, which extends astride a sector of a braking disk 109. The caliper 102 comprises a first half-body 103, a second half-body 104, and two connecting elements 105 and 1051 between the first and second half bodies 103 and 104.

The caliper 102 can be fixed to a stub axle of the suspension of the motor vehicle, and the disk 109 is suitable for association with a wheel of the motor vehicle. The first and second half-bodies 103 and 104 are in the form of reflectively symmetrical elongate shells to be positioned on opposite sides of the disk 109.

In particular, the first half-body 103 is arranged so as to face a first braking surface 191 of the disk. The second half-body 104 is positioned so as to face a second braking surface 192 of the disk.

Each of the first and second half-bodies 103 and 104 has a surface 130 or 141 facing the disk and an opposed surface 131 or 140.

Each of the surface 130 of the first half-body 103 which faces the disk and the surface 141 of the second half-body 104 which faces the disk has two seats 133 or 143, respectively, (FIG. 9 shows only the lateral seats 143) formed beside a corresponding central portion 132 or 142.

Each of the lateral seats 133 and 143 has through-holes 134 and 144 for housing corresponding screws 135 and 145 for fixing to the connecting elements 105 and 105'.

In each of the central portions 132 and 142, on the other hand, two hydraulic braking cylinders are formed integrally in the first and second half-bodies 103 and 104 and are arranged so as to face and open onto the respective surfaces 130 and 141 facing the disk, only the cylinders 140 of the second half-body 104 being shown in FIG. 9.

Moreover, each of the first and second half-bodies 103 and 104 comprises a pair of pistons guided for sliding in the hydraulic cylinders.

The first and second half-bodies 103 and 104 have ducts in conventional manner, for supplying brake fluid to the cylinders formed in the half-bodies and housing the pistons.

In each of the central portions 132 and 142 there are also two through-holes 136 or 146, respectively, for engagement by two guide pins 106.

The guide pins 106 have the function of guiding two pads 107, each mounted between the pistons of the first and second half-bodies 103 and 104 and the braking surfaces 191, 192 of the disk.

In particular, the pads 107 which, typically, are wholly identical and opposed, comprise respective plates 171 for supporting corresponding friction linings 172. The friction linings 172 are fixed, in conventional manner, to respective support surfaces 173 of the plates, these surfaces facing towards the braking surfaces of the disk. Moreover, each plate 171 has two through-holes 174 corresponding to the through-holes 136 and 146 formed in the first and second half-bodies 103 and 104, respectively.

The plates 171 comprise, in portions 122a and 122b, weights 115a and 115b similar to those described with reference to FIGS. 1–3. The weights 115a and 115b may be fixed to the plates 171 by the methods described above. The fixed-caliper disk brake unit 100 further comprises wholly conventional elastic means 108 for holding the pads 107 on the guide pins 106 and, at the same time, keeping them away from the disk when the disk brake unit is not in operation.

The connecting elements 105 and 105' are interposed between the first and second half-bodies 103 and 104 of the caliper 102. In the embodiment shown, the element 105' is disposed in the region in which the disk emerges from the caliper during its rotation (as indicated by the arrow "i" of FIG. 9) and the element 105, remote from the element 105', is disposed, for example, in the region in which the disk enters the caliper during its rotation.

The operation of the fixed-caliper disk brake of FIG. 9 is known and will therefore not be described in detail. The advantages with regard to the performance of the disk brake of FIG. 9 are clear from the foregoing description given with reference to the disk brake of FIG. 1.

Naturally, in order to satisfy contingent and specific requirements, an expert in the art may apply to the above-described pad and disk brake many modifications all of which, however, are included within the scope of protection of the invention as defined by the appended claims.

What is claimed is:

1. A pad for a disk brake comprising a plate for supporting a friction lining which can come into contact, at a braking stage, with a disk associated with the disk brake, wherein the plate has a mass and the pad comprises a mass-varying means disposed only beyond a radially outer edge of the disk and associated rigidly with the plate, substantially to form a single rigid body, and for varying the mass of at least one portion of the plate so as to achieve an inertia of the pad that substantially prevents vibrations of the pad which could cause noise of the disk brake, during braking.

2. A pad for a disk brake according to claim 1 in which the pad has a moment of inertia, evaluated with respect to an axis about which the pad vibrates during braking, corresponding to a natural frequency of vibration of the pad which is substantially such as not to be excited at the braking stage.

3. A pad according to claim 1 in which the mass-varying means comprise at least one weight which can be connected rigidly to a portion of the plate.

4. A pad according to claim 3 in which the plate has means for fixing of the at least one weight.

5. A pad according to claim 4, in which the means for fixing of the at least one weight allow the weights to be removed and/or replaced.

6. A pad according to claim 1, in which the mass-varying means comprise first and second mass-varying means associated with regions which are disposed at opposite ends of the plate and which can face an input region and an output region of the disk, respectively.

7. A pad according to claim 6 and in which the first mass-varying means comprise a first weight and the second mass-varying means comprise a second weight, the first weight having a mass smaller than the mass of the second weight.

8. A pad according to claim 1 in which the mass-varying means comprise at least one element which can be connected rigidly to the plate and which has a specific weight different from the specific weight of a material of the plate.

9. A plate for supporting a friction lining for a disk-brake pad according to claim 1.

10. A disk brake comprising:
a pad which can be placed in contact with a disk associated with the brake in order to exert a braking action,
a caliper-holder body which can be arranged astride the disk and which can house the pad, and
means operatively connected to the pad for activating the braking force,
characterized in that the pad is in accordance with claim 1.

* * * * *